(12) United States Patent
Kossett et al.

(10) Patent No.: US 8,505,230 B2
(45) Date of Patent: Aug. 13, 2013

(54) ROBOT MOUNTING DEVICE

(75) Inventors: Alex J. Kossett, Minneapolis, MN (US);
Ernest Langdon, Clifton, VA (US);
Wade D. Palashewski, Andover, MN (US)

(73) Assignee: ReconRobotics, Inc., Edina, MN (US)

( * ) Notice: Subject to any disclaimer, the term of this patent is extended or adjusted under 35 U.S.C. 154(b) by 423 days.

(21) Appl. No.: 12/827,829

(22) Filed: Jun. 30, 2010

(65) Prior Publication Data
US 2012/0185093 A1 Jul. 19, 2012

(51) Int. Cl.
*F41A 23/28* (2006.01)

(52) U.S. Cl.
USPC ............................... 42/94; 89/37.04

(58) Field of Classification Search
USPC .................... 42/94; 89/37.04, 37.15
See application file for complete search history.

(56) References Cited

U.S. PATENT DOCUMENTS

| 1,906,870 | A | * | 5/1933 | Palla ................................ 42/94 |
| 5,058,238 | A | | 10/1991 | Lautenschlaeger |
| 6,548,982 | B1 | | 4/2003 | Papanikolopoulos et al. |
| 7,467,490 | B2 | * | 12/2008 | Mossberg et al. ................. 42/77 |
| 2004/0021316 | A1 | | 2/2004 | Rogg |

FOREIGN PATENT DOCUMENTS

KR 20-0442100 Y1 10/2008

* cited by examiner

*Primary Examiner* — Stephen M Johnson
*(74) Attorney, Agent, or Firm* — Douglas J. Christensen

(57) ABSTRACT

A robot mounting device includes a pair of spaced-apart arms adapted to retain robot body of a surveillance robot. The robot mounting device also includes a latching mechanism to secure the robot mounting device to a rifle. The positioning of the robot can be adjusted within robot mounting device to site a camera in the axle of the robot with respect to the rifle. The rifle can then be oriented to obtain visual imagery of an environment.

17 Claims, 15 Drawing Sheets

ROBOT MOUNTING DEVICE

FIELD OF THE INVENTION

The present invention relates to surveillance robots. More particularly, the present invention relates to accessories for transporting surveillance robots.

BACKGROUND OF THE INVENTION

During combat and other situations when an adversary may be encountered, obtaining visual surveillance of the surrounding environment can be beneficial. Gaining an appropriate visual vantage point, however, often places individuals and equipment in harm's way. For example, peering through a doorway to look into an adjacent room can expose an individual to hostile fire. Personnel ascending and descending stairwells and entering attic spaces may be similarly exposed to hidden or unexpected dangers.

Outdoor environments can provide similar obstacles to visual surveillance which, when circumnavigated or avoided, may expose an individual to hostile fire. Such obstacles may include, for example, walls, fences, berms, buildings, rock formations, and the like.

Existing surveillance equipment for providing indirect visualization of a desired environment varies in complexity from extendable mirrors to mobile robots. The use of robotic surveillance systems, such as illustrated in FIG. 15, is becoming increasingly common in hostile environments. The robots used in these surveillance systems are utilized to provide visual images.

After delivery into an area to be surveilled, such as by throwing, the robots can be remotely maneuvered with an operator control unit to position the robot and embedded camera as desired by a user. A drawback of these devices is that their use is limited by the availability of terrain (i.e., a ground surface) or objects that can support the robot. A further drawback is that once positioned into a hostile environment, retrieval of the robot can be limited or impractical due to the presence of adversaries and physical obstacles that cannot be overcome after delivery, such as occurs when a robot is thrown over a wall. A further drawback of these devices, however, is that deployment or use requires a user to lower the user's weapon or hold a weapon with one hand so that the other hand can be used for the surveillance device. By lowering the weapon or removing a hand from the weapon, the user is effectively tactically disengaged from the situation or loses effectiveness and thereby becomes more vulnerable.

SUMMARY OF THE INVENTION

The present invention effectively meets the aforementioned needs by providing an apparatus and method for mounting a mobile surveillance robot to existing structure on a firearm such as a rifle. A mount for a surveillance robot according to an embodiment includes a rifle-coupling portion, a body, and a robot-coupling portion. The rifle-coupling portion generally defines structure coupleable to structure of the rifle. The respective structures of the rifle-coupling portion and the rifle may be complementary to provide for a keyed fit. The body of the mount may include a tensioned released mechanism to removably secure the mount onto the rifle. The accessory-coupling portion may include a pair of opposed retaining arms made of a deflectable material for creating a pressure fit around an accessory. The accessory may, for example, be a two-wheeled surveillance robot having a body that can be received by the opposed retaining arms.

In an embodiment of the present invention, a rifle mount has a cross-shaped receiver portion connecting to a clamping portion. The clamping portion is configured to removably grasp a throwable surveillance robot and the receiver potion is configured to removably engage a bayonet-receiving portion of a rifle.

A feature and advantage of embodiments of the present invention is that a remote-controlled, self-propelled robot that may be readily available to soldiers and law enforcement personnel in the field can be adapted to provide a gun-mounted video surveillance source. This provides soldiers and law enforcement personnel, as well as other individuals who may be situated in a command station, the ability to monitor an environment using a surveillance robot attached to a rifle.

Another feature of embodiments of the present invention is that it provides for adjustable positioning of the accessory in at least two perpendicular directions. This allows a user to optimize the position of the accessory with respect to the rifle in accordance with user preference. A further feature of embodiments of the present invention is the use of mechanical advantage to enhance coupling of the mount to the rifle. Yet another feature of the present invention is the reduction and/or elimination of structure which can result in mechanical failure during operation. In particular, the present invention utilizes the deflectable, resilient, and/or elastomeric properties of shaped materials to secure a desired accessory in position with respect to the mount while reducing complexity of operation for the user. In addition, the present invention is generally reversible to accommodate either the right or left dominant eyes of users. In particular, the mount can be positioned on either lateral side of a ride to avoiding obstructing vision of the user.

A feature and advantage of embodiments of the present invention is that gun mounts and accessory mounting structure existing on rifles are utilized to carry mobile robots possessing surveillance capabilities. This allows an individual carrying the rifle to be able to readily position the robot and so that an individual accompanying the user or otherwise situated in a control center can monitor and/or direct operations. It is also a feature and advantage of embodiments of the present invention that it allows a user, such as a soldier or a SWAT team member, to obtain visual surveillance of an environment while maintaining the ability to accurately engage the surveilled environment with the user's weapon.

BRIEF DESCRIPTION OF THE DRAWINGS

The embodiments of the present invention may be more completely understood in consideration of the following detailed description of various embodiments of the invention in connection with the accompanying drawings, in which.

Figure 1:
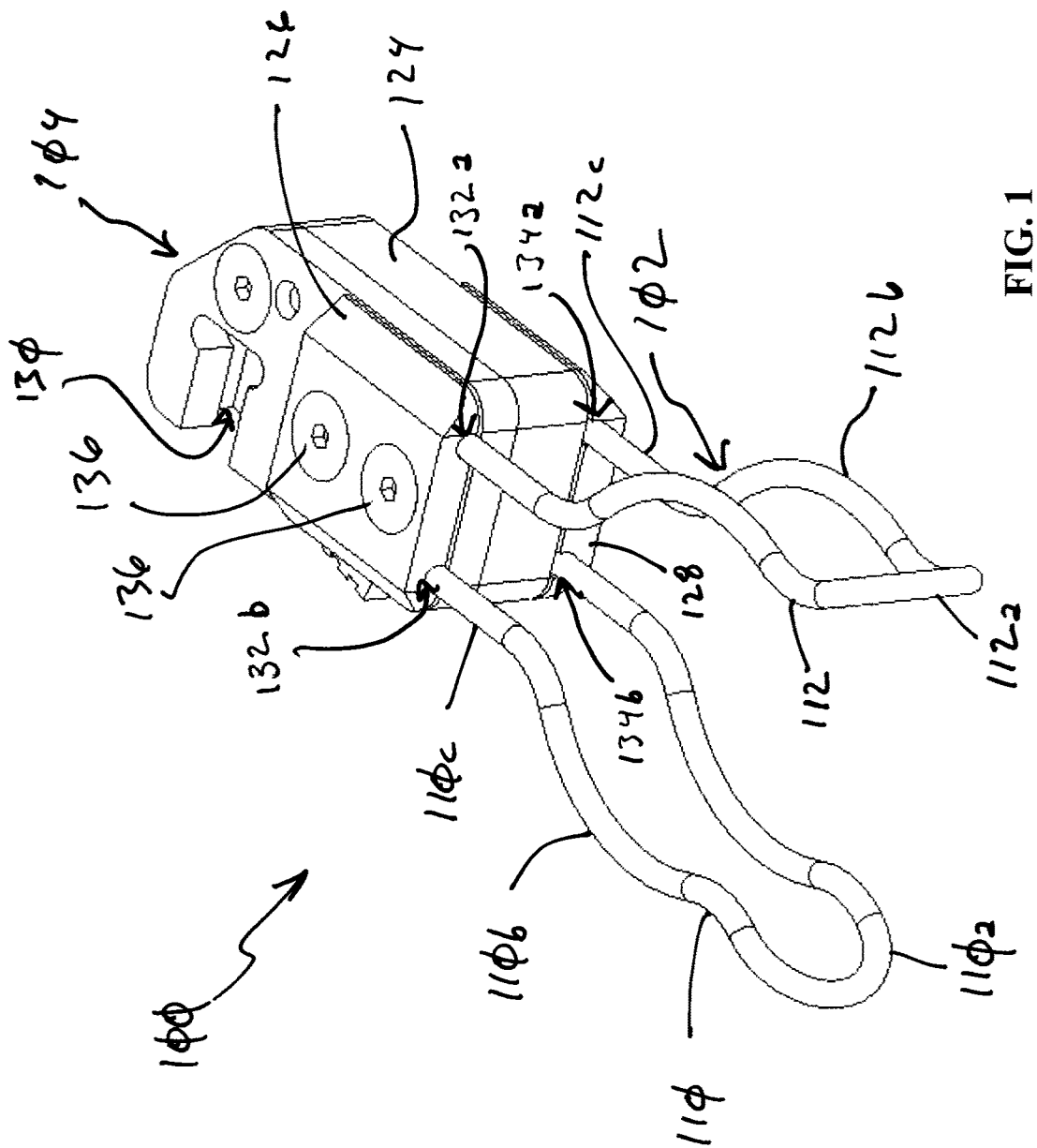
FIG. 1 is perspective view of a robot mounting device according to an embodiment of the present invention

While the present invention is amendable to various modifications and alternative forms, specifics thereof have been shown by way of example in the drawings and will be described in detail. It should be understood, however, that the intention is not to limit the present invention to the particular embodiments described. On the contrary, the intention is to cover all modifications, equivalents, and alternatives falling within the spirit and scope of the present invention.

DETAILED DESCRIPTION OF THE DRAWINGS

Figure 12:
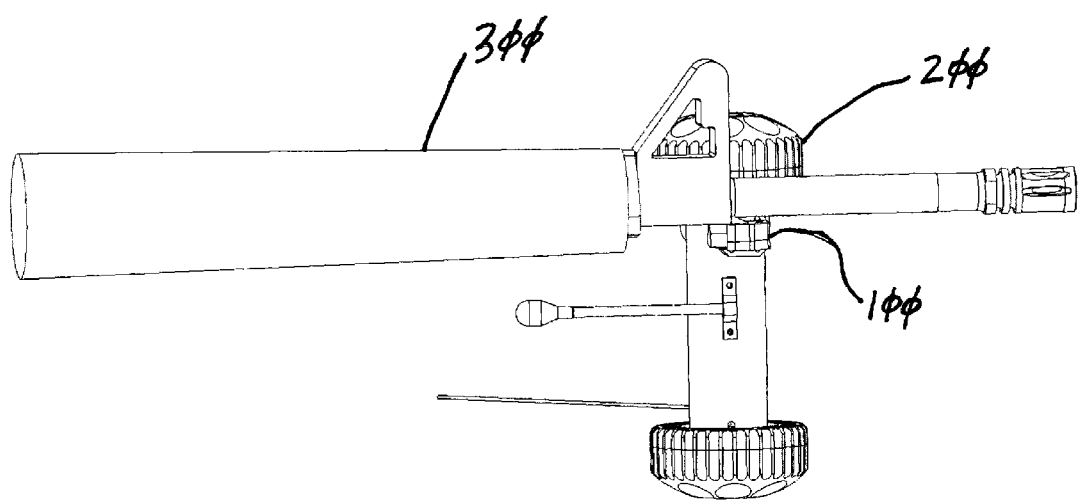
FIG. 12 is a substantially side view of a robot mounting device according to an embodiment of the present invention mounted to a rifle and holding a surveillance robot.

A robot mounting device according to an embodiment of the present invention is depicted generally in FIG. 1 with reference numeral 100. Robot mounting device 100 generally includes robot attachment portion 102 and rifle attachment portion 104. Although robot mounting device 100 can be used for a number of purposes, robot mounting device 100 can be used to mounting surveillance robot 200 to rifle 300 according to an embodiment of the present invention and as depicted in FIG. 12.

Figure 10:
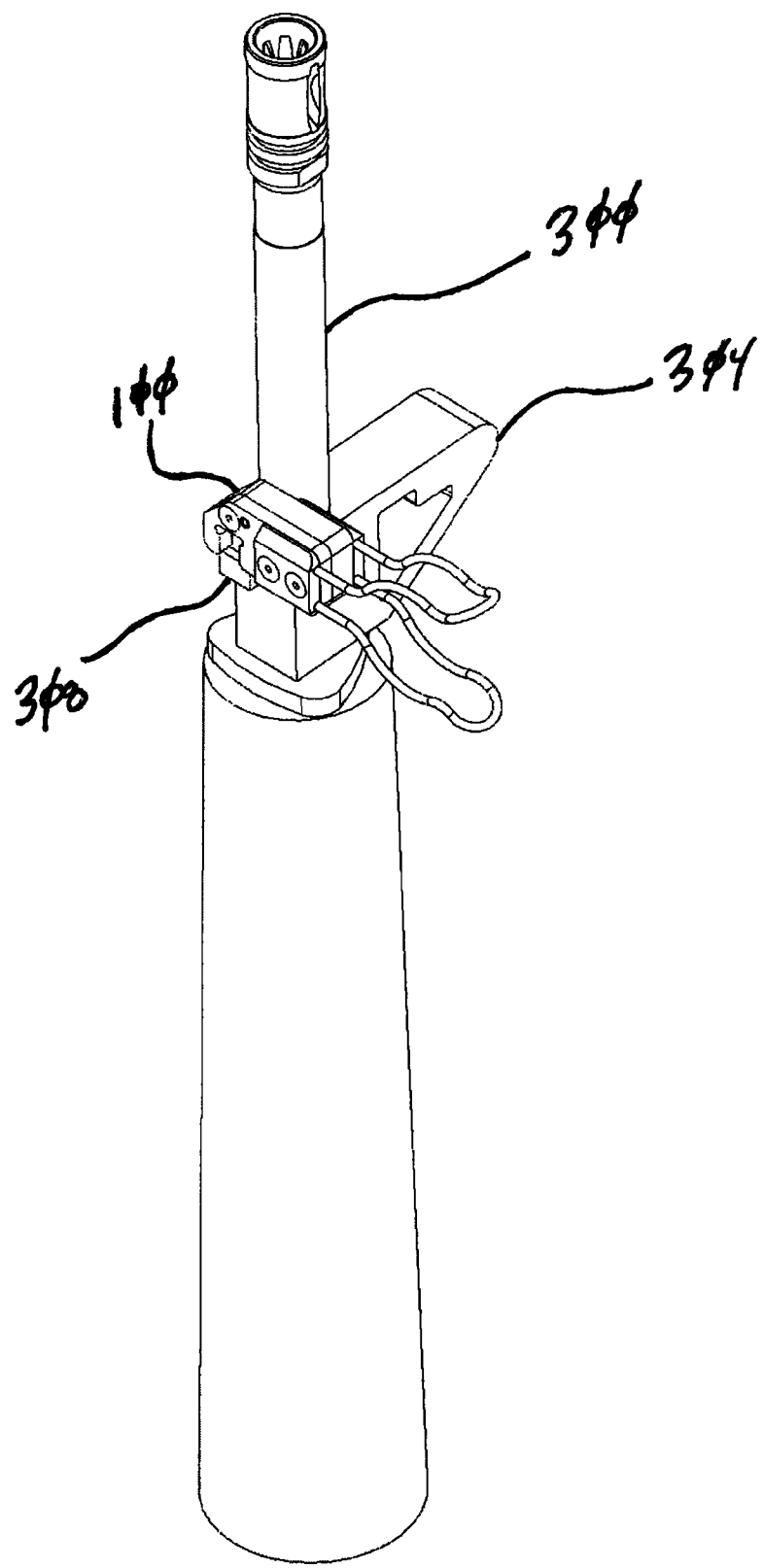
FIG. 10 is a perspective view of a robot mounting device according to an embodiment of the present invention mounted to a rifle.
Figure 11:
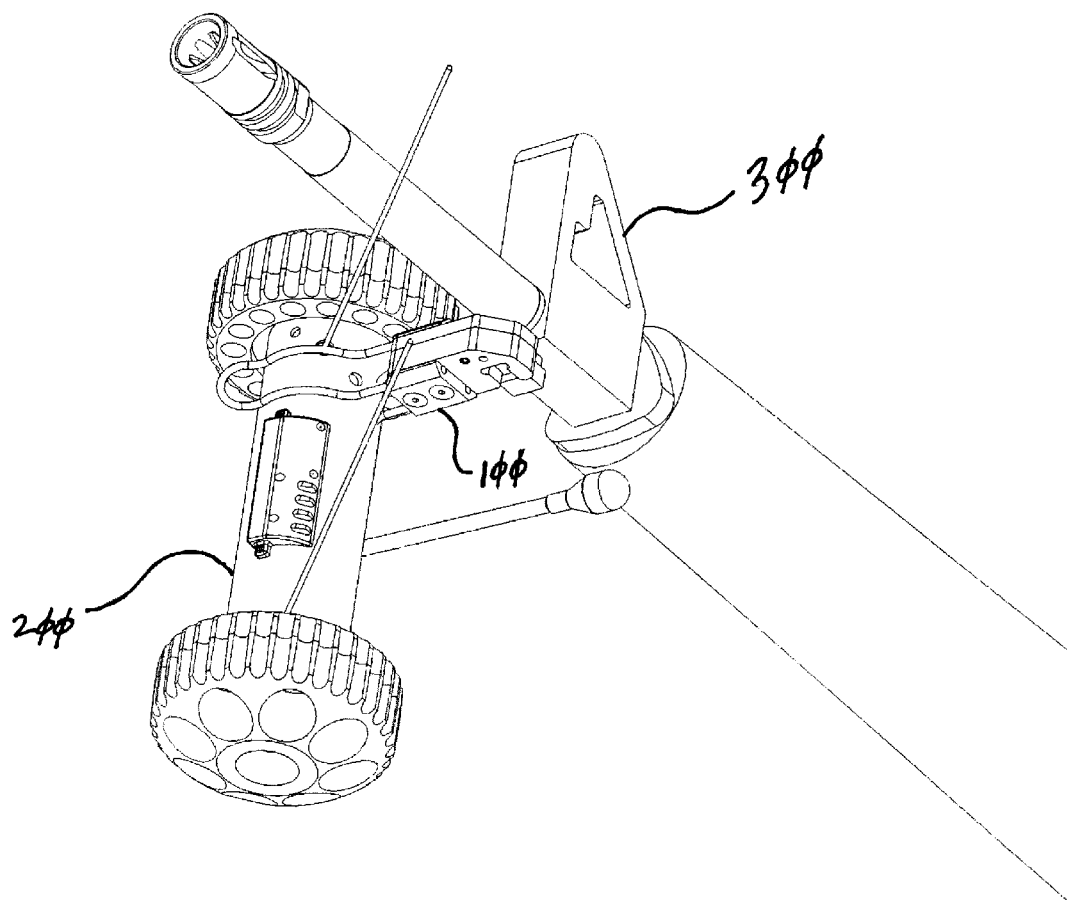
FIG. 11 is a perspective view of a robot mounting device according to an embodiment of the present invention mounted to a rifle and holding a surveillance robot.
Figure 13:
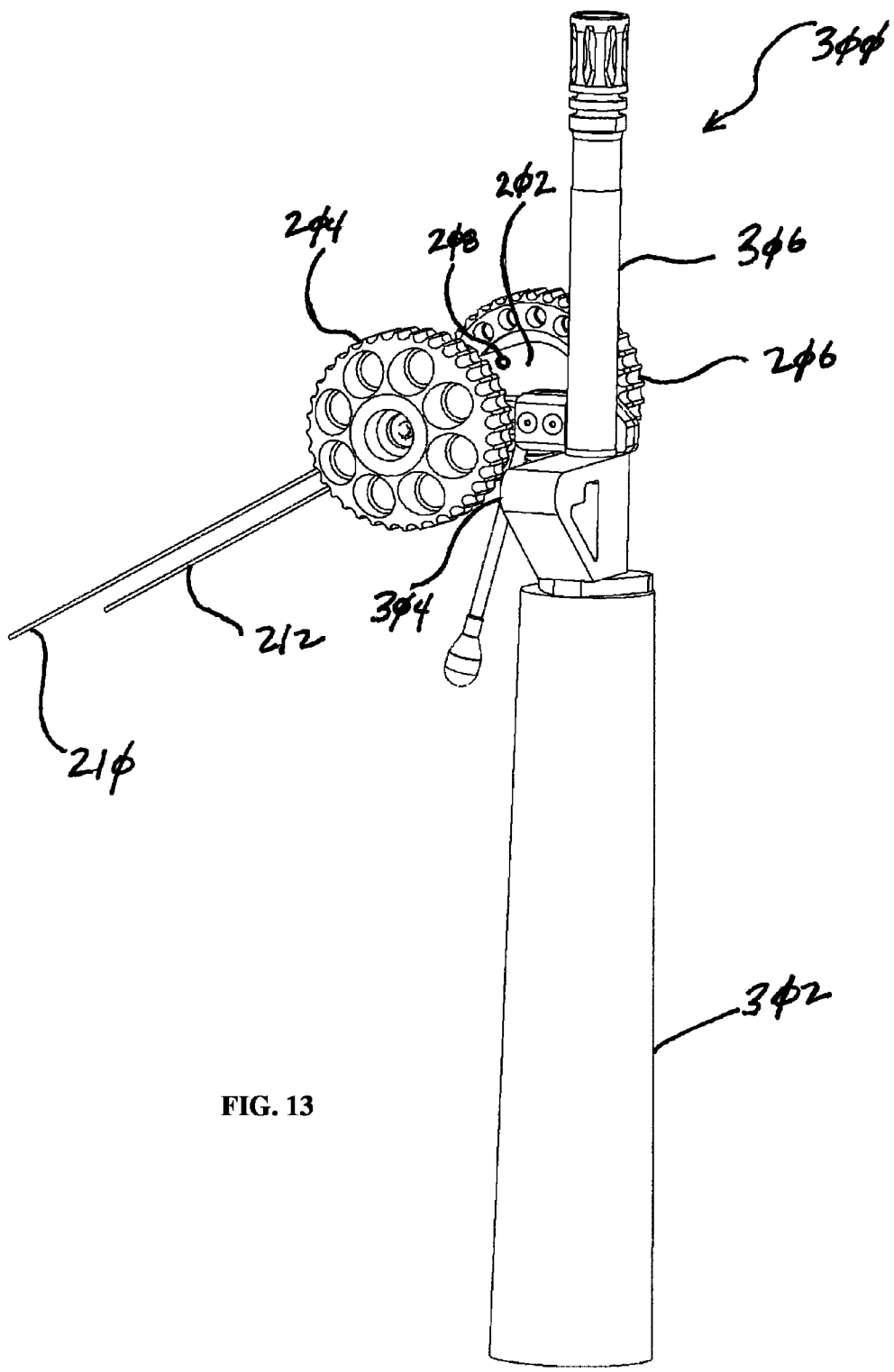
FIG. 13 is a perspective view of a robot mounting device according to an embodiment of the present invention mounted to a rifle and holding a surveillance robot.
Figure 14:
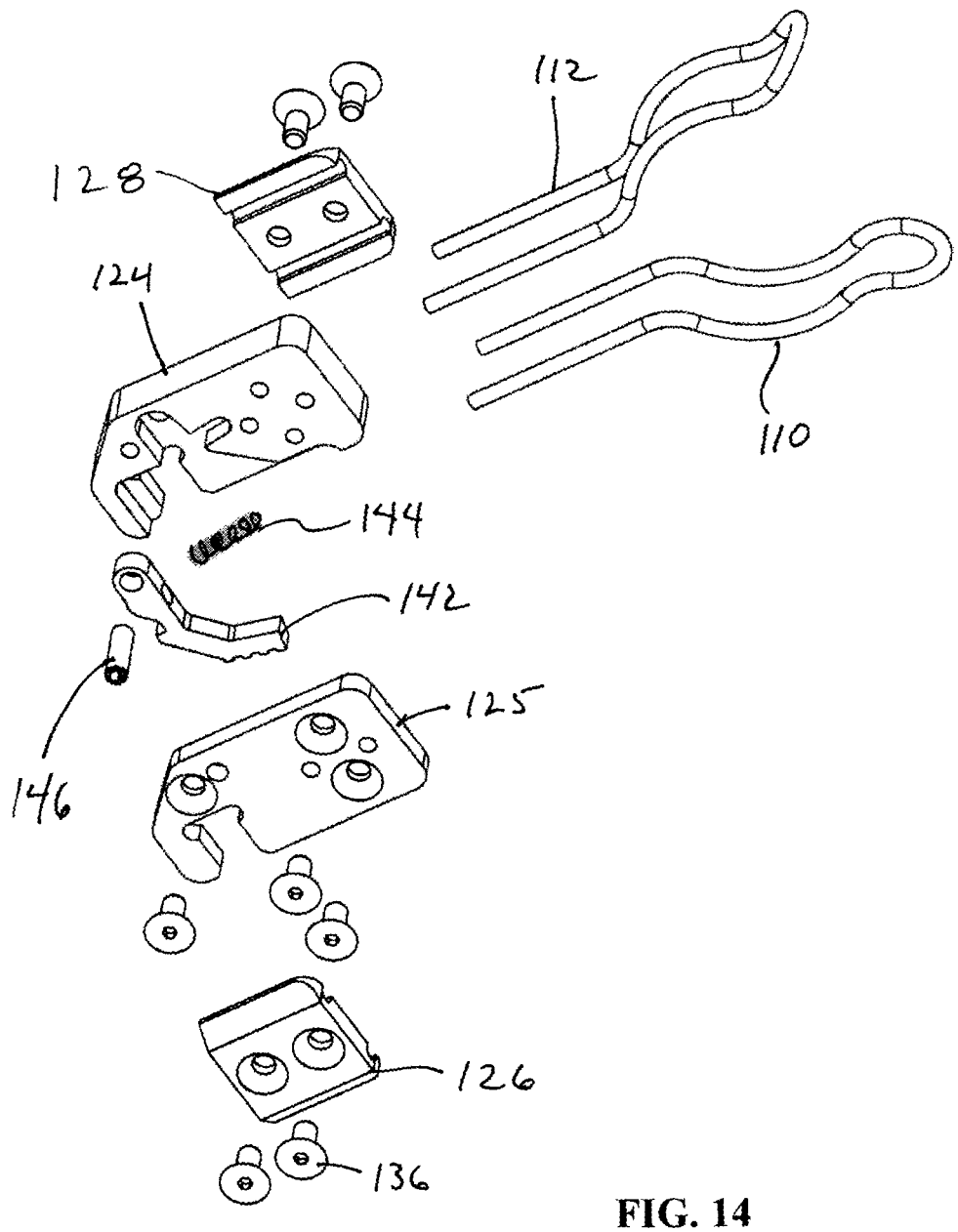
FIG. 14 is an exploded perspective view of a robot mounting device according to an embodiment of the present invention.
Figure 15:
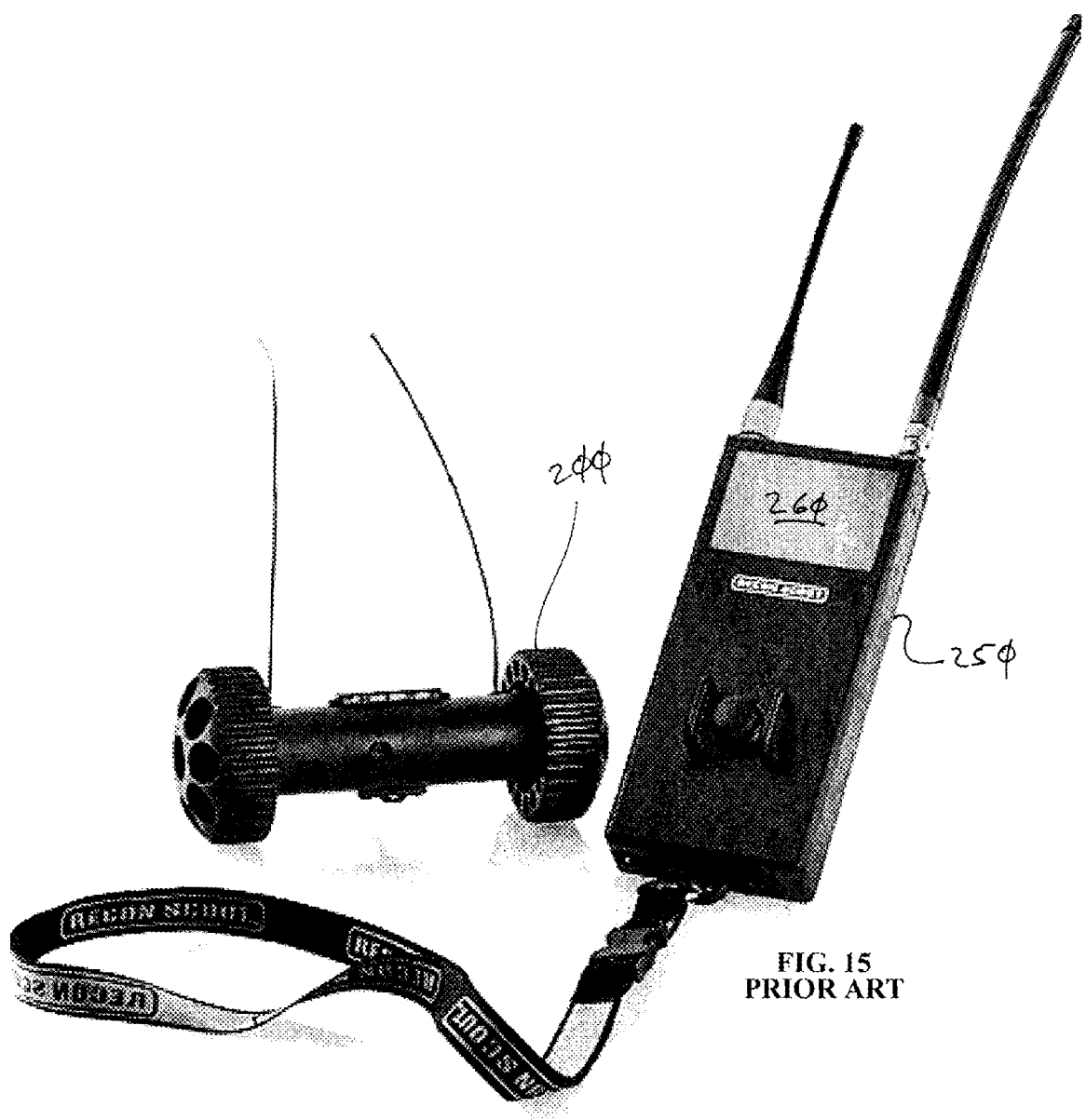
FIG. 15 is a perspective view of a surveillance system including a robot and operator control unit according to the prior art.

Without limiting the scope of the present invention, structural aspects of robot 200 and rifle 300 are described for reference purposes. Referring to FIG. 13, robot 200 may include axle 202 and wheels 204, 206. Axle 202 may include camera 208 for receiving images which may, for example, be used in visual surveillance. Robot 200 may also include transmitter antenna 210 and receiver antenna 212. Robot 200 may be used in connection with and controlled by operator control unit 250, as depicted in FIG. 15. Operator control unit 250 generally includes a display screen 260 for displaying the images captured by camera 208. Operator control unit 250 generally also includes electronics for controlling the movement of and imagery captured by robot 200. Rifle 300 may include forearm 302, forward sight 304, and barrel 306. As depicted in FIG. 10, forward sight 304 may include attachment structure 308, such as a bayonet lug or a Picatinny rail, Weaver rail, or similar rail structure.

In general, robot mounting device 100 may be used in connection with any number of surveillance systems using robots, such as are described, for example, in U.S. Pat. Nos. 6,548,982, 6,860,346, and 7,559,385, U.S. Patent Application Nos. 61/121,141, Ser. Nos. 12/634,610, 29/351,692, and International Application No. PCT/US2009/067395, the disclosures of which are hereby incorporated herein by reference in their entirety.

Figure 2:
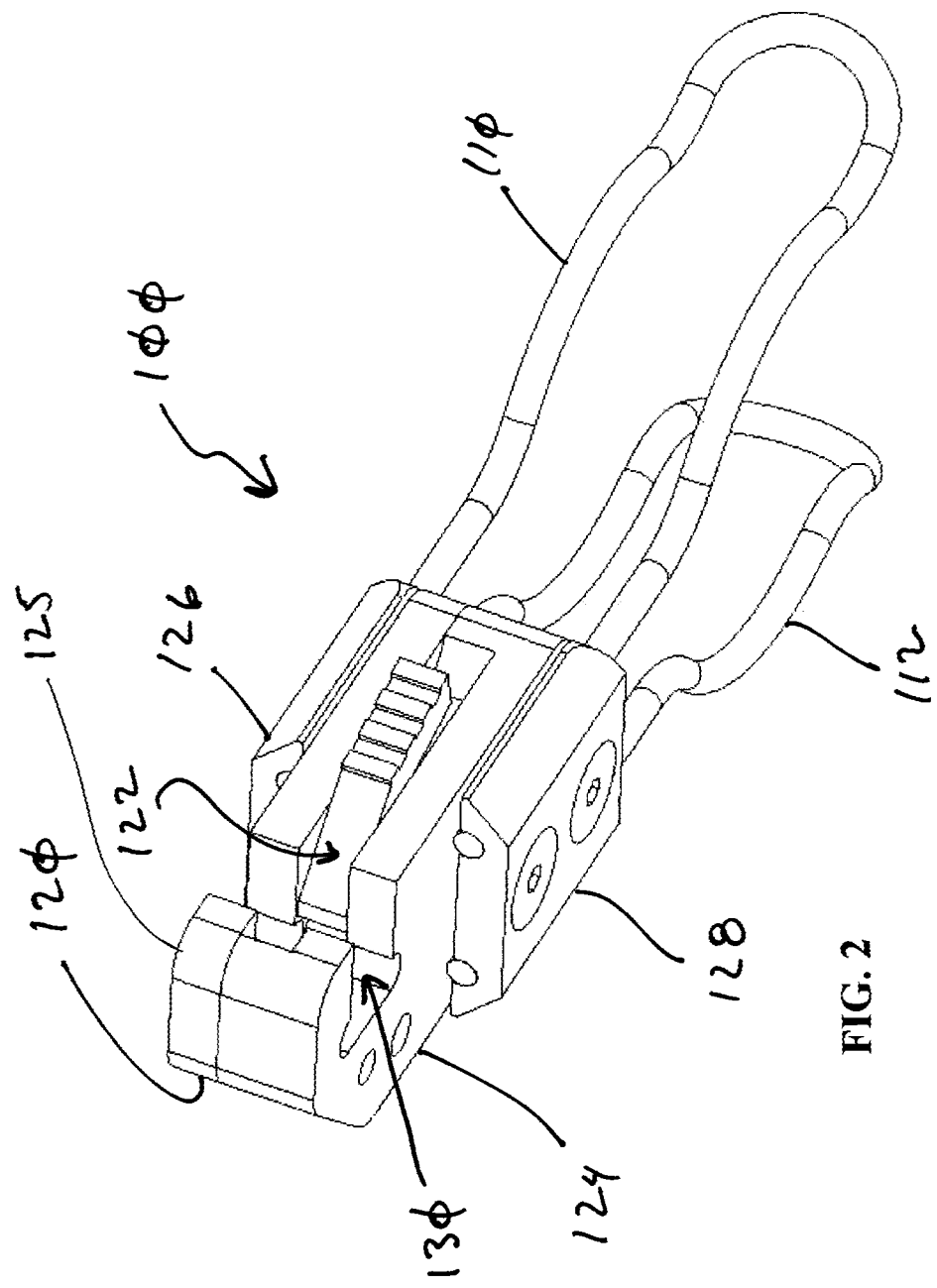
FIG. 2 is a perspective view of a robot mounting device according to an embodiment of the present invention.
Figure 3:
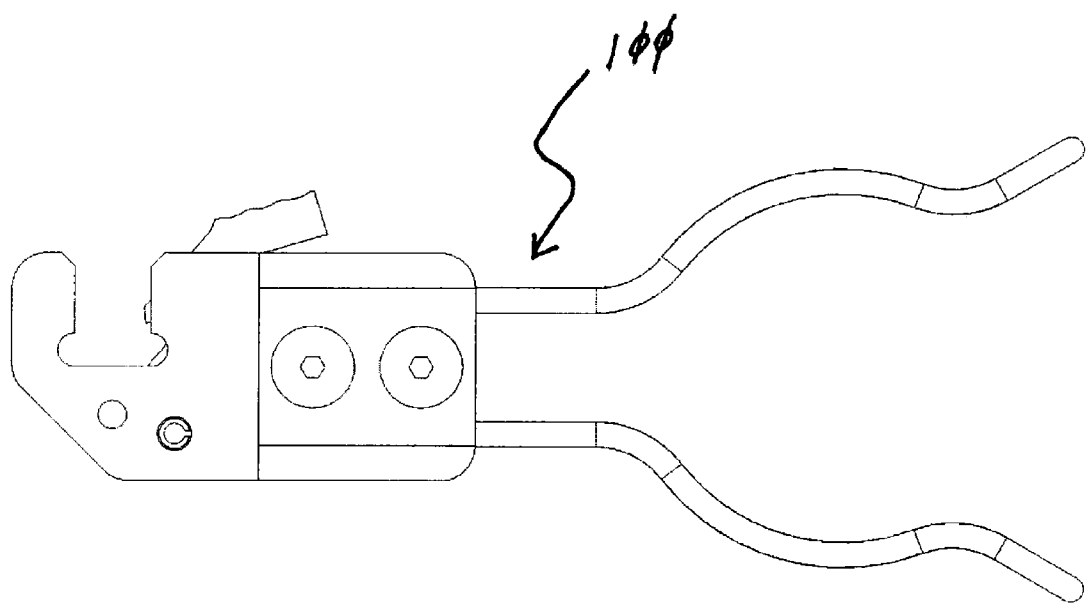
FIG. 3 is a substantially top view of a robot mounting device according to an embodiment of the present invention.
Figure 4:
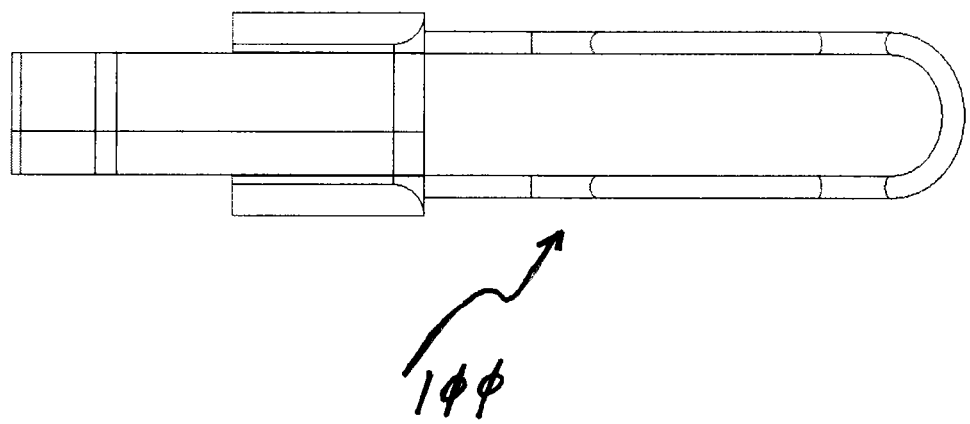
FIG. 4 is a substantially side view of a robot mounting device according to an embodiment of the present invention.

Referring to FIGS. 1-2, robot attachment portion 102 includes arms 110, 112. Arm 110 generally has distal portion 110a, middle portion 110b, and proximal portion 110c. Similarly, arm 112 generally has distal portion 112a, middle potion 112b, and proximal portion 112c. In an embodiment, at least middle portions 110b, 112b are substantially curved to complement a cylindrical shape, such as, for example, an axle 202 of robot. Arms 110, 112 are generally made from a deflectable and/or resilient material. In an embodiment, arms 110, 112 are shaped from bent wire. In an alternative embodiment, arms 110, 112 are made from a solid, integral material.

Rifle attachment portion 104 includes body 120 and latch mechanism 122. Body 120 generally may include first body portion 124, second body portion 125, and plates 126, 128. First body portion 124 and second body portion 125 define channel 130. In an embodiment, channel 130 is configured to receive rail structure 308 of rifle 300. Plate 126 may define plate channels 132a, 132b. Similarly, plate 128 may define plate channels 134a, 134b.

In an embodiment, plate channels 132a, 132b and plate channels 134a, 134b are configured to receive proximal portions 110c, 112c of arms 110, 112. Arms 110, 112 are generally interchangeable within plate channels 132a, 132b and plate channels 134a, 134b.

Plates 126, 128 are generally coupled to first and second body portions 124, 125. In an embodiment, plates 126, 128 are coupled to body portions 124, 125 with mechanical fastening members 136, such as, for example screws. First and second body portions 124, 125 may be secured with screws 137 that, when robot mounting device 100 is assembled, are covered by plate 126. Fastening members 136 can facilitate a compression fit between plates 126, 128 and body 120 to substantially secure arms 110, 112, within plate channels 132a, 132b and plate channels 134a, 134b.

Figure 5:
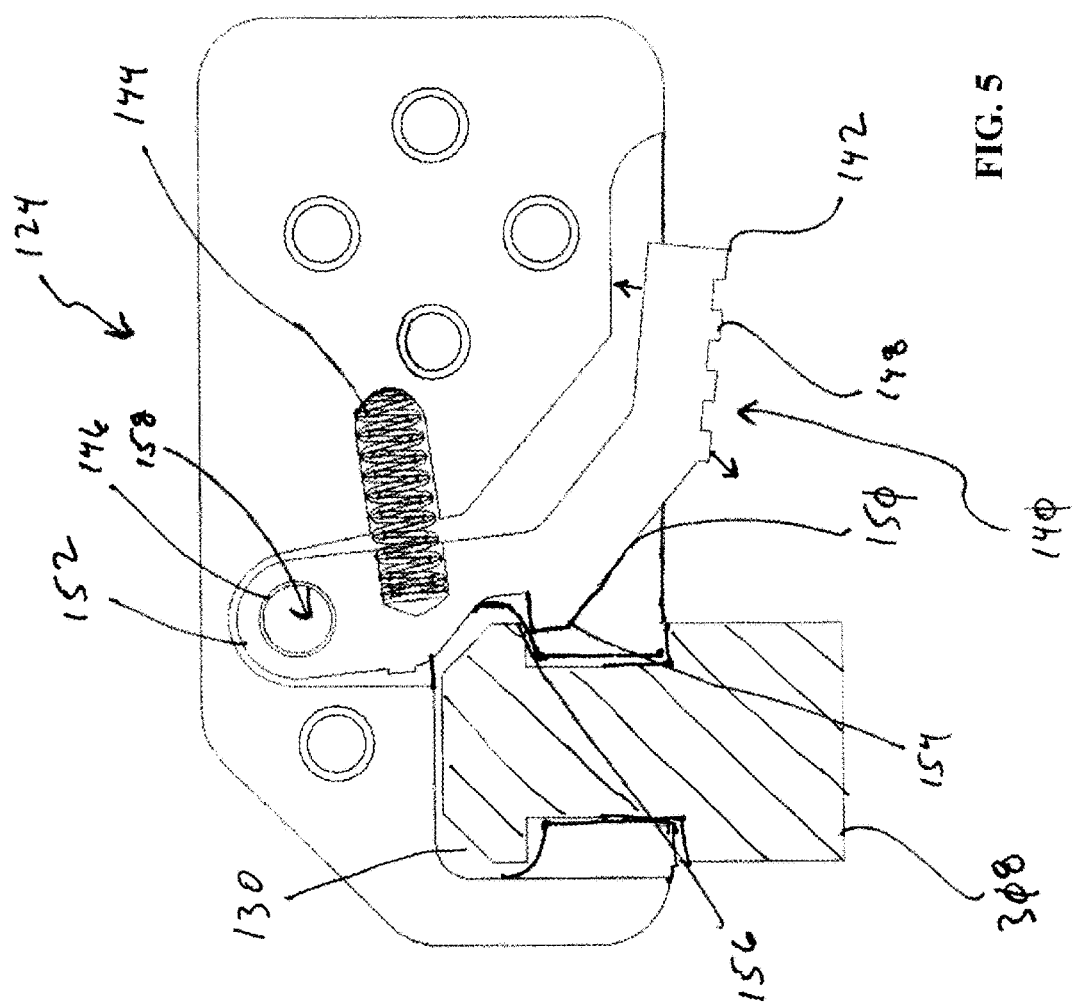
FIG. 5 is a top cross-sectional view of a robot mounting device taken intermediate two body portions according to an embodiment of the present invention.
Figure 6:
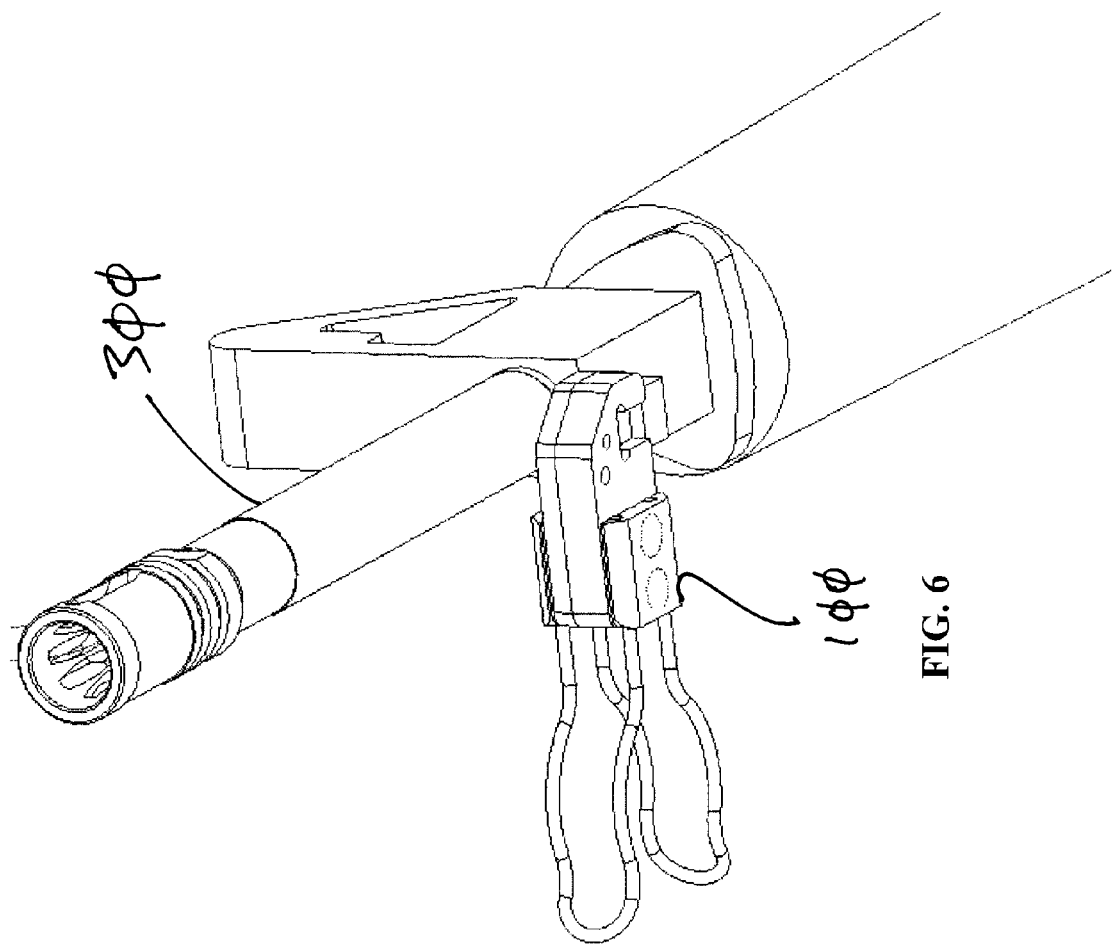
FIG. 6 is a perspective view of a robot mounting device according to an embodiment of the present invention mounted to a rifle.

Referring to FIG. 5, body 120 generally has rifle lock 140 or other retaining member. Rifle lock 140 or other retaining member may be incorporated into robot mounting device 100 to facilitate retention of robot mounting device 100 on rifle 300. Rifle lock 140 may include lock arm 142 and biasing member 144 sandwiched between first and second body portions 124, 125. Rifle lock 140 may also include pivot pin 146. Lock arm 140 can have actuating portion 148, engaging portion 150, and pivoting portion 152. Actuating portion 148 may be configured to facilitate operation by a user, such as, for example, by including ridges to enhance frictional contact. Engaging portion 150 may be configured to engage attachment structure 308 of rifle 300. In an embodiment, engaging portion 150 has flange 154 and defines recess 156. Flange 154 and recess 156 are generally shaped to be complementary to the structure of attachment structure 308 of rifle 300. Pivoting portion 152 may define pivoting aperture 158 configured to receive pivot pin 146.

Figure 7:
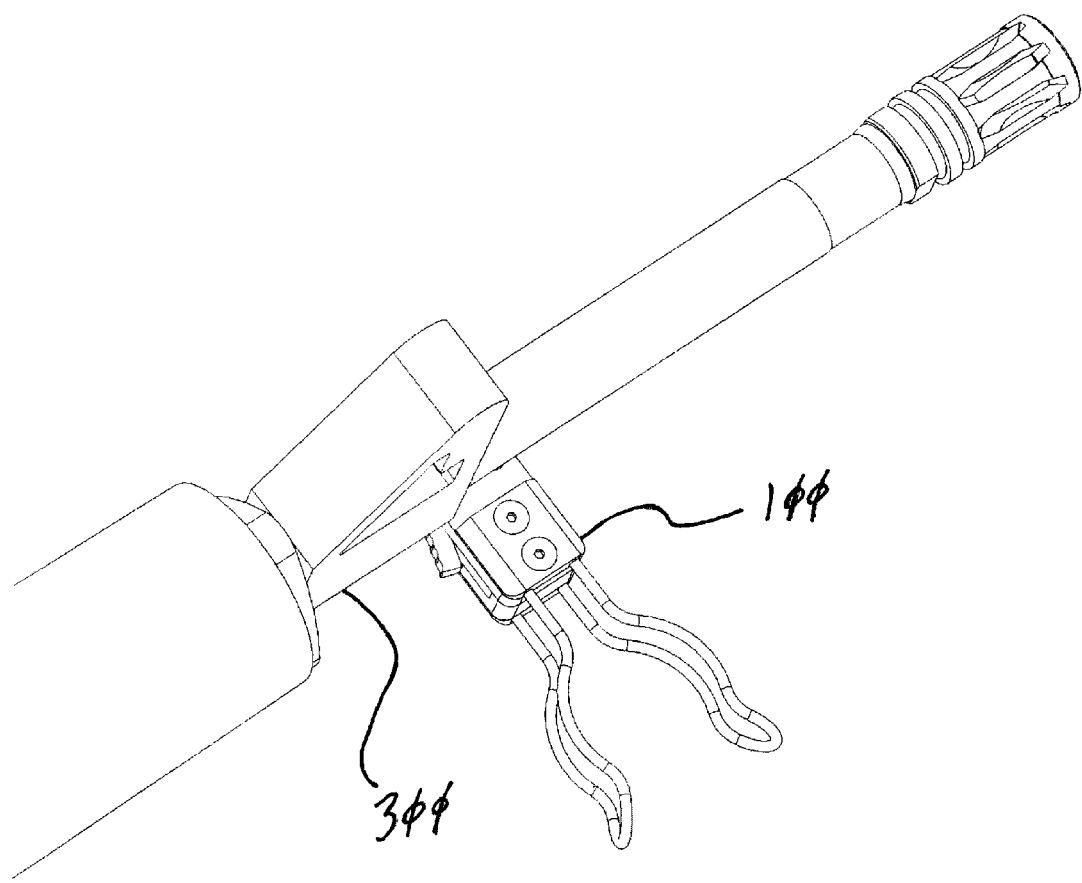
FIG. 7 is a perspective view of a robot mounting device according to an embodiment of the present invention mounted to a rifle.
Figure 8:
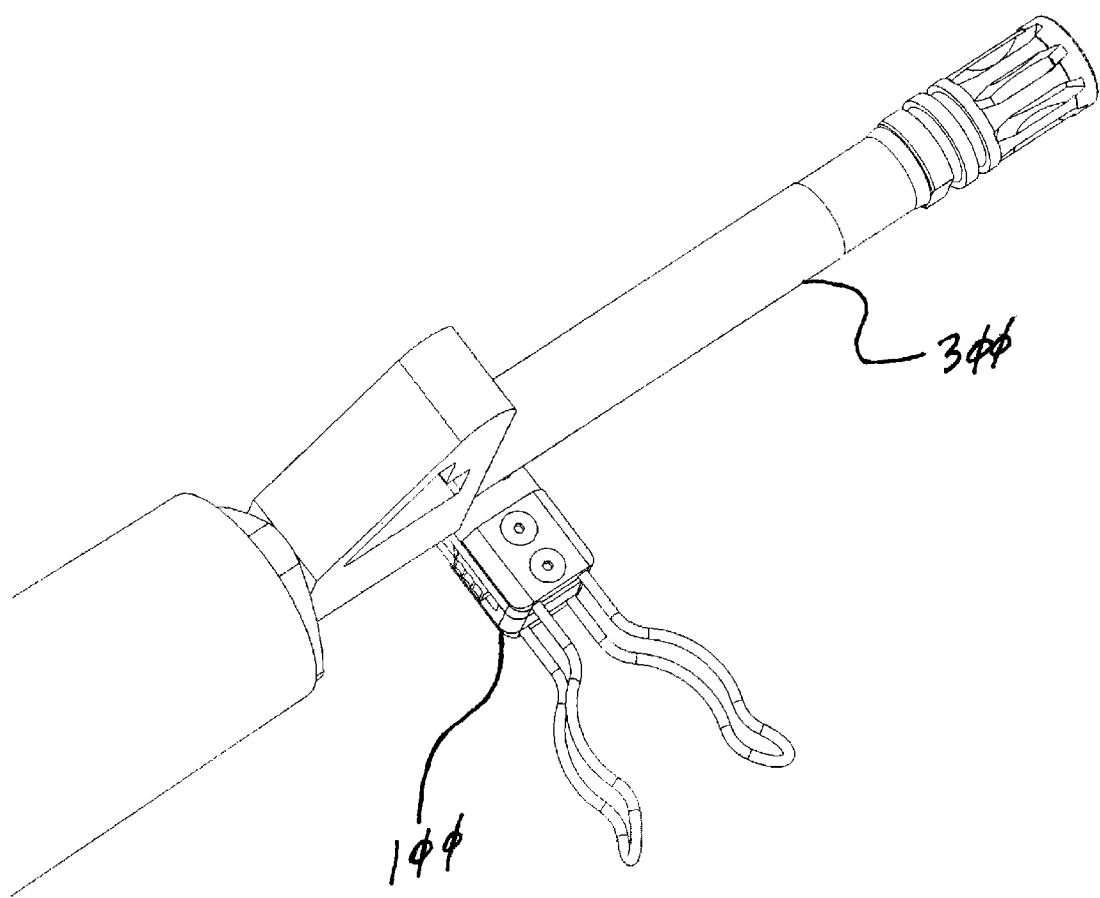
FIG. 8 is a perspective view of a robot mounting device according to an embodiment of the present invention mounted to a rifle.
Figure 9:
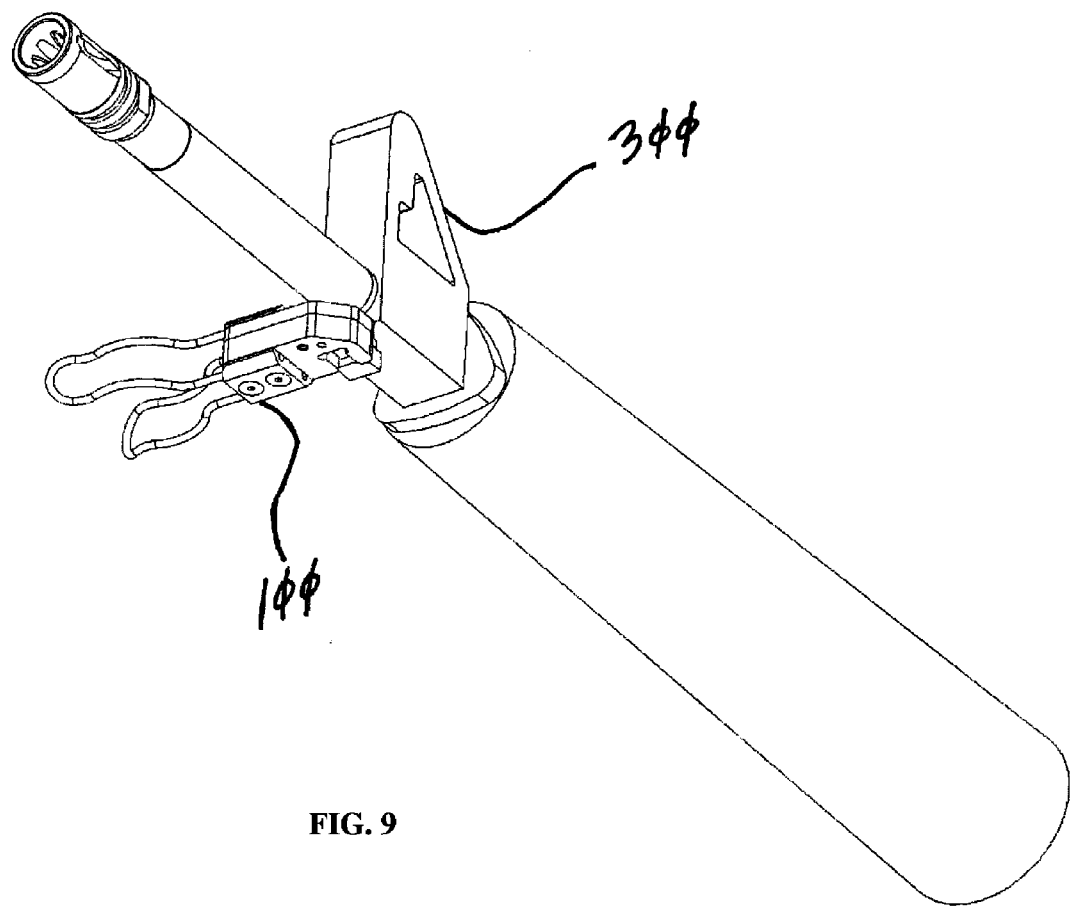
FIG. 9 is a perspective view of a robot mounting device according to an embodiment of the present invention mounted to a rifle.

Biasing member 144 is generally coupled to lock arm 142 and bracket 124. In an embodiment, biasing member 144 is a coil spring. Biasing member 144 generally urges lock arm 140 toward a locked position, as depicted in FIG. 7. When lock arm 140 is in the locked position, engaging portion 150 substantially engages attachment structure 308 of rifle 300. Actuating portion 140 can be pushed by a user such that lock arm 140 is in the unlocked position, as depicted in FIG. 8.

When lock arm 140 is in the unlocked position, engaging portion 150 is substantially disengaged from attachment structure 308.

Robot mounting device 100 and the various components of robot mounting device 100 can be made from any number of materials. In an embodiment, arms 110, 112 are made from spring steel. In an embodiment, body potions 124, 125 and plates 126, 128 are made from anodized aluminum. In an embodiment, fastening members 136 are made from carbon steel with a black oxide coating. In another embodiment, fastening members 136 are made from stainless stell. In yet another embodiment, fastening members are made from or coated with nickel. One skilled in the art will readily recognize that robot mounting device 100 and the various components of robot mounting device 100 can be made from any number of materials that support the functionality of robot mounting device 100 and the various components of robot mounting device 100 without departing from the spirit or scope of the present invention.

In operation, a user can use robot mounting device 100 to mount robot 200 to rifle 300. The user can push, such as with a thumb or other digit, actuating portion 148 of lock arm 140. This causes lock arm 140 to rotate about pivot pin 146 into the unlocked position such that engaging portion 150 is substantially clear of channel 130.

With lock arm 140 in the unlocked position, robot mounting device 100 can be placed onto rifle 300 by sliding attachment structure 308 of rifle 300 into channel 130. The user can then release actuating portion 140 of lock arm 140. With actuating portion 140 released, biasing member 144 urges lock arm 140 into the locked position by rotating lock arm 140 about pivot pin 134. In the locked position, engaging portion 150 engages the complementary structure of attachment structure 308. Biasing member 144 generally applies sufficient force to lock arm 144 such that robot mounting device 100 is self-secured to attachment structure 308.

In an embodiment, a user can attach robot mounting device 100 to rifle 300 without pushing actuating portion 140 of lock arm 140. For example, a user can slide attachment structure 308 of rifle 300 into channel 130. As the use slide robot mounting device 100 toward barrel 306, engaging portion 150 is urged out of the way until biasing member 144 causes flange 154 to engage attachment structure 308 of rifle 300.

To secure robot 200 to robot mounting device 100, a user can align axle 202 of robot 200 with distal portions 110*a*, 112*a* of arms 110, 112. When additional force is applied to robot 200, arms 110, 112 deflect such that middle portions 110*b*, 112*b* receive axle 202. As axle 202 approaches the center of middle portions 110*b*, 112*b*, arms 110, 112 can begin to return to their original shape. This, in turn, causes arms 110, 112 to grasp axle 202 or robot 200. In an embodiment, arms 110, 112 are configured such that arms 110, 112 securely retain axle 202 of robot 200 while allowing for adjustment of the position of robot 200 with respect to robot mounting device 100. For example, robot 200 can be rotated within arms 110, 112 with respect to the axis of rotation of wheels 204, 206. Robot 200 can also be shifted laterally along the axis of rotation of wheels 204, 206 with respect to robot mounting device 100.

With robot 200 secured to robot mounting device 100 and robot mounting device 100 secured to rifle 300, a user can rotate robot 200 to position camera 208 as desired. In an embodiment, a user can position camera 208 substantially parallel to the longitudinal axis of barrel 306 of rifle 300. In another embodiment, a user can position camera 208 substantially perpendicular to the longitudinal axis of barrel 306 of rifle 300. A user can, in fact, position camera 208 360 degrees with respect to the longitudinal axis of barrel of rifle. In yet another embodiment, a user can secure one of wheels 204, 206 of robot 200 between arms 110, 112 or robot attachment portion 102. A remote operator controlling operator control unit 250 can thereby actuate wheels 204, 206. With one of wheels 204, 206 substantially held in place by arms 110, 112, robot body 202 can rotate with respect to wheels 204, 206. In this manner, the position of camera 208 with respect to the longitudinal axis of barrel 306 can be rotationally adjusted without requiring manual re-adjustment of robot 200 within arms 110, 112.

The user can thereby position rifle with respect to environmental obstacles to gain visual imagery of the surrounding environment without placing the user within the direct visual line of sight gained by camera 208 of robot.

The invention claimed is:

1. A device for mounting a robot to a rifle, the robot including a robot body disposed intermediate first and second wheels, the rifle including a barrel and accessory mounting structure attached to the barrel, the device comprising:
   a body defining a channel configured to receive the accessory mounting structure of the rifle;
   a first arm coupled to the body;
   a second arm coupled to the body and spaced apart from the first arm to conformingly receive the robot body of the robot such that the robot body is captured intermediate the first and second arms;
   a lever operably coupled to the body, the lever rotatable about an axis between a locked position wherein a portion of the lever at least partially occupies the channel to engage the accessory mounting structure and a released position wherein the portion is clear of the channel; and
   a biasing member coupled to the lever, the biasing member urging the lever toward the locked position.

2. The device of claim 1, wherein each of the first and second arms are made from a material that is at least one of deflectable and resilient.

3. The device of claim 1, wherein the robot body comprises a substantially cylindrical robot body and the first and second arms are configured to capture the substantially cylindrical robot body.

4. A device for mounting a robot to a rifle, the robot including a robot body disposed intermediate first and second wheels, the rifle including a barrel and accessory mounting structure attached to the barrel, the device comprising:
   a body defining a channel configured to receive the accessory mounting structure of the rifle, the body including a lock integral with the body and reversibly operable to substantially secure the body to and release the body from the accessory mounting structure of the rifle;
   a first arm coupled to the body;
   a second arm coupled to the body and spaced apart from the first arm to conformingly receive the robot body of the robot such that the robot body is captured intermediate the first and second aims; and
   a biasing member coupled to the lock, the biasing member urging the lever toward the locked position.

5. The device of claim 4, wherein each of the first and second arms are made from a material that is at least one of deflectable and resilient.

6. The device of claim 4, wherein the robot body comprises a substantially cylindrical robot body and the first and second arms are configured to capture the substantially cylindrical robot body.

7. A system for conducting surveillance with a rifle, the rifle including a barrel and accessory mounting structure attached to the barrel, the device comprising:

a robot having robot body disposed intermediate first and second wheels, the robot body including a camera;

an operator control unit including a monitor adapted to display an image received by the camera;

a robot mount comprising:
- a body defining a channel configured to receive the accessory mounting structure of the rifle;
- a first arm coupled to the body;
- a second arm coupled to the body and resilient and spaced apart from the first arm to conformingly receive the robot body of the robot such that the robot body is captured intermediate the first and second arms;
- a lever operably coupled to the body, the lever rotatable about an axis between a locked position wherein a portion of the lever at least partially occupies the channel to engage the accessory mounting structure and a released position wherein the portion is clear of the channel; and
- a biasing member coupled to the lever, the biasing member urging the lever toward the locked position.

8. The device of claim 7, wherein each of the first and second arms are made from a material that is at least one of deflectable and resilient.

9. The device of claim 7, wherein the robot body is substantially cylindrical and the first and second arms are configured to capture the substantially cylindrical robot body.

10. A device for mounting a robot to a rifle, the robot including a robot body disposed intermediate first and second wheels, the rifle including a barrel and accessory mounting structure attached to the barrel, the device comprising:
- a body defining a channel configured to receive the accessory mounting structure of the rifle, the body including retaining structure integral with the body and configured to substantially retain and release the accessory mounting structure of the rifle within the channel;
- a first arm coupled to the body;
- a second arm coupled to the body and resilient and spaced apart from the first arm to conformingly receive the robot body of the robot such that the robot body is captured intermediate the first and second arms.

11. The device of claim 10, wherein each of the first and second arms are made from a material that is at least one of deflectable and resilient.

12. The device of claim 10, wherein the robot body comprises a substantially cylindrical robot body and the first and second arms are configured to capture the substantially cylindrical robot body.

13. A device for mounting a robot to a rifle, the robot including a robot body disposed intermediate first and second wheels, the rifle including a barrel and accessory mounting structure attached to the barrel, the device comprising:
- a body defining a channel configured to receive the accessory mounting structure of the rifle, the body including retaining structure integral with the body and configured to substantially retain and release the accessory mounting structure of the rifle within the channel;
- a first arm coupled to the body;
- a second arm coupled to the body and spaced apart from the first arm to conformingly receive one of the first and second wheels of the robot such that the wheel is captured intermediate the first and second arms.

14. The device of claim 13, wherein each of the first and second arms are made from a material that is at least one of deflectable and resilient.

15. The device of claim 13, wherein the robot body comprises a substantially cylindrical robot body and the first and second arms are configured to capture the substantially cylindrical robot body.

16. A device for mounting a robot to a rifle, the robot including a robot body disposed intermediate first and second wheels, the rifle including a barrel and accessory mounting structure attached to the barrel, the device comprising:
- a mounting means for receiving the accessory mounting structure of the rifle;
- a securing means for, by actuation of the securing means, retaining and releasing the accessory mounting structure of the rifle within the mounting means, the securing means being integral with the mounting means; and
- a grasping means for capturing the robot body.

17. The device of claim 16, wherein the grasping means are made from a material that is at least one of deflectable and resilient and configured to capture a substantially cylindrical robot body.

* * * * *